(12) United States Patent
Angel

(10) Patent No.: US 6,723,944 B1
(45) Date of Patent: Apr. 20, 2004

(54) PINCH WELD GUN

(75) Inventor: Jeffrey R. Angel, Lake Orion, MI (US)

(73) Assignee: Progressive Tool & Industries Co., Southfield, MI (US)

( * ) Notice: Subject to any disclaimer, the term of this patent is extended or adjusted under 35 U.S.C. 154(b) by 0 days.

(21) Appl. No.: 10/298,818

(22) Filed: Nov. 18, 2002

Related U.S. Application Data (60) Provisional application No. 60/408,467, filed on Sep. 5, 2002.

(51) Int. Cl.[7] .............................. B23K 11/10; B23K 9/28
(52) U.S. Cl. .......................................... 219/90; 219/120
(58) Field of Search .......................... 219/90, 116, 120

(56) References Cited

U.S. PATENT DOCUMENTS

| | | | | |
|---|---|---|---|---|
| 2,215,289 A | * | 9/1940 | Hensel et al. | 219/120 |
| 2,355,145 A | * | 8/1944 | Carison | 219/120 |
| 2,448,396 A | * | 8/1948 | Schebler et al. | 219/120 |
| 3,021,417 A | * | 2/1962 | Halberstadt | 219/90 |
| 4,393,293 A | * | 7/1983 | Inoue et al. | 219/90 |
| 4,485,289 A | * | 11/1984 | Schwartz | 219/90 |
| 5,252,801 A | | 10/1993 | Angel et al. | 219/86.61 |
| 5,739,499 A | | 4/1998 | Suzio et al. | 219/90 |
| 6,469,272 B2 | | 10/2002 | Dugas et al. | 219/86.32 |

* cited by examiner

*Primary Examiner*—Clifford C. Shaw
(74) *Attorney, Agent, or Firm*—Young & Basile, P.C.

(57) ABSTRACT

A pinch type weld gun wherein the weld arms are pivotally mounted on the frame structure via a ball bearing structure including annular members of insulative material positioned in apertures in the weld arms, inner races fixedly mounted on a common pivot pin, outer races positioned within the respective insulative annular members, and ball races positioned between the respective inner races and respective outer races. A shunt is fixedly secured at one end thereof to a gun electrode and fixedly secured at another end thereof to the gun transformer, and the other end of the shunt defines a coolant passage communicating with the transformer coolant passage system whereby coolant may be delivered to the transformer coolant passage system through the coolant passage in the other end of the shunt. A second shunt fixedly secured at one end thereof to a further electrode and fixedly secured at another end thereof to the transformer defines a further coolant passage in the other end thereof communicating with the transformer coolant passage system so that the coolant may be delivered to the transformer coolant passage system through the coolant passage in the other end of the first shunt and discharged from the transformer coolant passage system through the coolant passage in the other end of the second shunt to provide a continuous flow of coolant through the transformer coolant passage system. A cooling liquid distribution block is mounted on the gun frame at a location remote from the electrodes and concentric tubing extends from the distribution block to the electrodes for respective connection to concentric passageways defined in the electrodes.

21 Claims, 10 Drawing Sheets

PINCH WELD GUN

CROSS-REFERENCE TO RELATED APPLICATION

This Application claims the priority date of United States Provisional Patent Application Ser. No. 60/408/467 filed Sep. 5, 2002.

FIELD OF THE INVENTION

This invention relates to weld guns and more particularly to weld guns especially suitable for use in industrial automotive applications.

BACKGROUND OF THE INVENTION

Weld guns are in common usage in many industrial applications and in particular in automotive applications. Whereas a myriad of weld gun designs have been proposed and/or utilized commercially, there is still a need for a simpler weld gun design, providing a less expensive cost of assembly; for a weld gun design that is easier to service, thereby reducing servicing costs; and for a weld gun design that provides a longer life, thereby reducing replacement costs.

SUMMARY OF THE INVENTION

This invention is directed to the provision of an improved weld gun.

More specifically, this invention is directed to the provision of a weld gun design that is simple, inexpensive and durable.

The weld gun of the invention is of the type including a frame structure, a weld arm, and a pivot structure pivotally mounting the weld arm on the frame structure.

According to a feature of the invention, the pivot structure comprises a pivot pin carried by the frame structure, an inner race mounted on the pivot pin, an annular member of electrically insulative material positioned in an aperture in the weld arm, an outer race mounted within the annular member, and a ball race rollably positioned between the inner race and the outer race. This arrangement allows the provision of a relatively robust ball bearing at the pivot structure at a relatively low cost.

According to a further feature of the invention, the weld arm comprises a first weld arm; the inner race comprises a first inner race; the annular member comprises a first annular member; the outer race comprises a first outer race; the ball race comprises a first ball race; and the weld gun further includes a second weld arm, a second inner race mounted on the pivot pin, a second annular member of electrically insulative material positioned in an aperture in the second weld arm, a second outer race mounted within the second annular member, and a second ball race rollably positioned between the second inner race and the second outer race. This arrangement allows the provision of a relatively inexpensive and yet robust ball bearing pivot structure for both arms of a pinch type weld gun.

According to a further feature of the invention, the first weld arm includes laterally spaced first and second arm portions; the second arm is positioned between the spaced arm portions of the first weld arm; the first inner race, first annular member, first outer race, and first ball race journal the first arm portion of the first weld arm on the pivot pin; and the weld gun further includes a third inner race mounted on the pivot pin, a third annular member of electrically insulated material positioned in an aperture in the second arm portion of the first arm, a third outer race mounted within the third annular member, and a third ball race positioned between the third outer race and the third inner race. This arrangement allows the provision of a robust, inexpensive ball bearing interconnection between both arms of a bifurcated weld arm and a further weld arm positioned between the spaced arm positions of the first weld arm.

The weld gun of the invention is also of the type including a frame structure, a transformer carried by the frame structure and including a coolant passage system, a weld arm mounted on the frame structure and including a weld tip at one end of the arm, and a shunt fixedly secured at one end thereof to another end of the weld arm and fixedly secured at another end thereof to the transformer.

According to a further feature of the invention, the other end of the shunt includes a coolant passage communicating with the transformer coolant passage system. With this arrangement a coolant may be delivered to the transformer coolant passage system through the coolant passage at the other end of the shunt.

According to a further feature of the invention, the weld arm comprises a first weld arm; the shunt comprises a first shunt; and the weld gun further includes a second weld arm mounted on the frame structure and including a weld tip at one end of the arm and a second shunt fixedly secured at one end thereof to another end of the second weld arm and fixedly secured at another end thereof to the transformer proximate the other end of the first shunt; and the other end of the second shunt includes a coolant passage communicating with the transformer coolant passage system. With this arrangement the coolant may be delivered to the transformer coolant passage system through the coolant passage in the other end of the first shunt and discharged from the transformer coolant passage system to a further coolant passage in the other end of the second shunt, whereby to provide a continuous flow of coolant through the transformer coolant passage system.

The weld gun of the invention is also of the type including a frame structure, a weld arm mounted on the frame structure, an electrode mounted at one end thereof on the weld arm and defining concentric cooling passages for delivery of a cooling liquid from the one electrode end to a weld tip at an opposite end of the electrode and return movement of cooling liquid from the weld tip to the one electrode end, a source of cooling liquid, and coolant flow means interconnecting the one end of the electrode and the cooling liquid source and operative to deliver cooling liquid from the source to the one electrode end for delivery to the weld tip and receive cooling liquid from the one electrode end for return to the source.

According to a further feature of the invention, the coolant flow means comprises a distribution device mounted on the frame structure as a location remote from the one end of the electrode, tubing structure for delivering coolant liquid from the source to the distribution device and returning coolant liquid from the distribution device to the source, and concentric tubing extending from the distribution device to the one end of the electrode for respective connection to the respective cooling passages defined by the electrode. This arrangement minimizes the shear volume of the tubing required to deliver cooling liquid to the electrode and return cooling liquid to the source, thereby simplifying the weld gun both from a constructional and an operational standpoint.

According to a further feature of the invention, the electrode comprises a first electrode and the weld arm comprises a first weld arm; the weld gun further includes a second weld arm mounted on the frame structure and a second electrode mounted at one end thereof on the second weld arm and defining concentric cooling passages for delivery of cooling liquid to a second weld tip on the opposite end of the second electrode and return movement of cooling liquid from the second weld tip to the one end of the second electrode; and the coolant flow means further includes further concentric tubing extending from the distributor device to the one end of the second electrode for respective connection to the respective cooling passages defined by the second electrode. This arrangement further reduces the shear volume of the tubing required to deliver and return the cooling liquid.

According to a further feature of the invention, the weld gun includes a transformer; the frame structure defines a cage structure mounting the transformer; and the distributor device comprises a distributor block mounted on the cage structure proximate the transformer. This arrangement provides a convenient packaging assembly that specifically removes tubing from the operational aspects of the weld gun.

According to a further feature of the invention the weld gun includes a shunt connected at a first end thereof to the one end of the electrode and at a second end thereof to the transformer, and the first end of the shunt clampingingly engages the one end of the electrode in surrounding relation to the concentric cooling passages defined by the first electrode. This specific arrangement further minimizes the tubing in the vicinity of the operational aspects of the weld gun.

BRIEF DESCRIPTION OF THE DRAWINGS

The description herein makes reference to the accompanying drawings wherein like reference numerals refer to like parts throughout the several views, and wherein.

DETAILED DESCRIPTION OF THE PREFERRED EMBODIMENT

The weld gun 10 of the invention, broadly considered, includes, a transformer 12, a cage or cradle assembly 14, an outer weld arm assembly 16, an inner weld arm 18, an upper electrode assembly 20, a lower electrode assembly 22, a power cylinder assembly 24, a balancing cylinder assembly 26, an upper shunt 28, a lower shunt 30, and a coolant distributor assembly 31.

Figure 1:
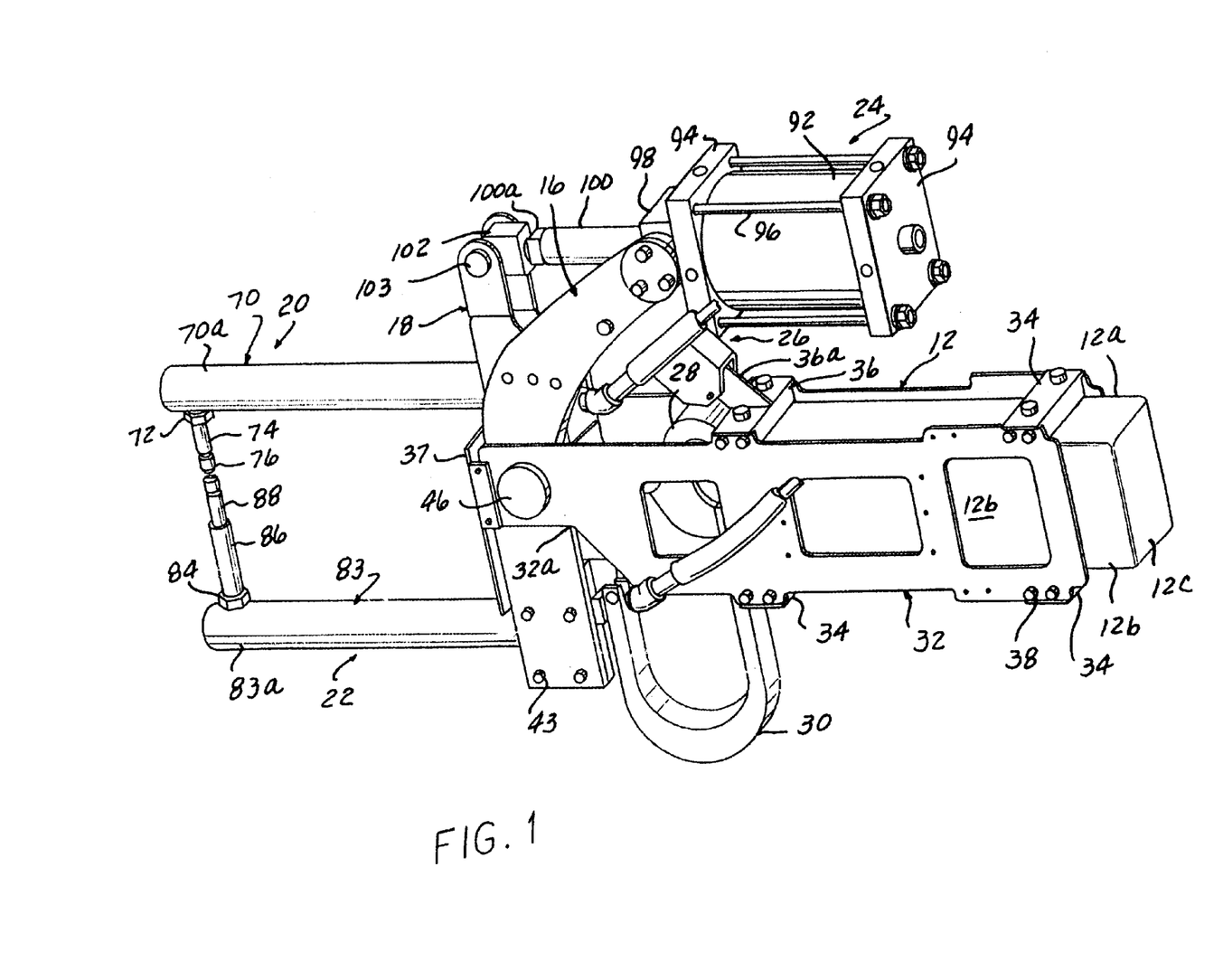
FIGS. 1 is a perspective view of a weld gun according to the invention.
Figure 1A:
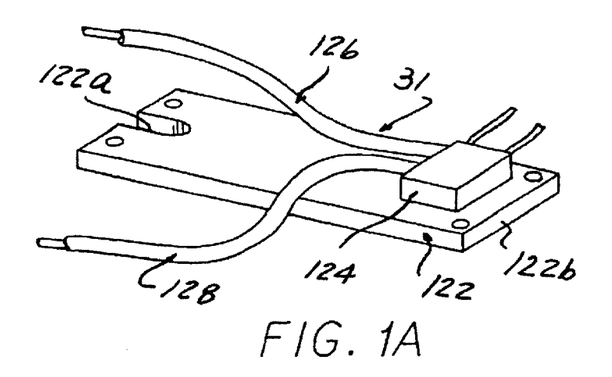
FIG. 1A is a perspective view of a coolant distributor assembly for the weld gun.
Figure 2:
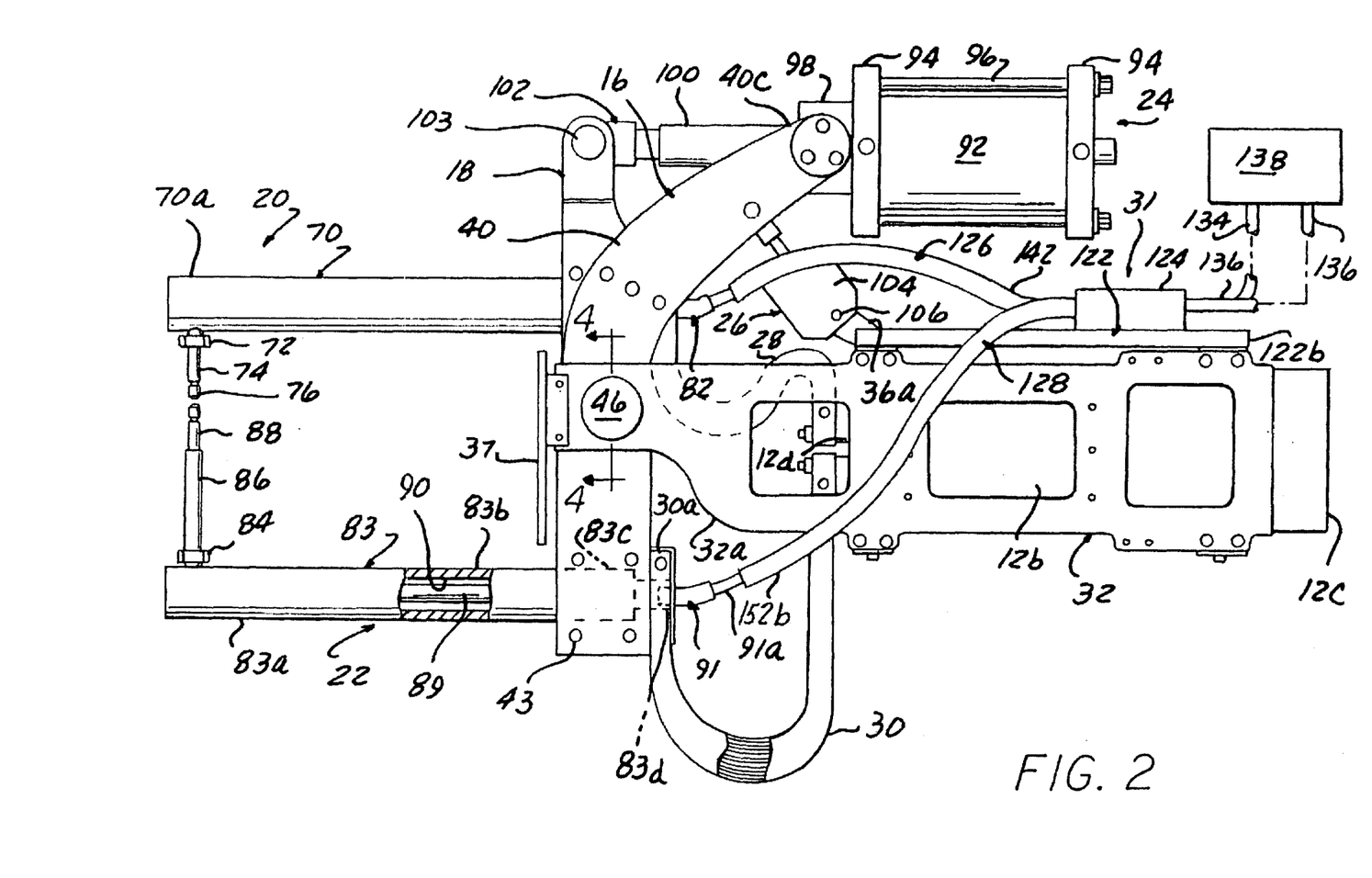
FIG. 2 is a side elevational view of the weld gun.
Figure 18:
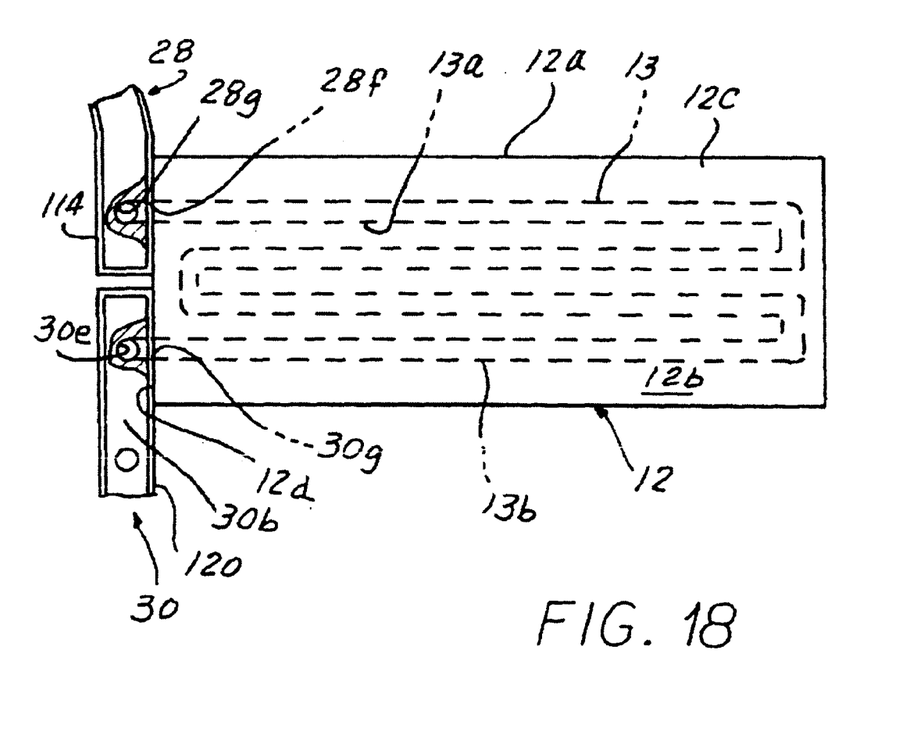
FIG. 18 is a detail view showing a transformer/shunt interface of the weld gun.

Transformer 12 (FIGS. 1, 2 and 18) is of known form and has a monolithic rectangular configuration including a top face 12a, side faces 12b, a rear end 12c, and a front face 12d. Transformer 12 in known manner includes a coolant passage system 13 to facilitate the delivery of coolant to the transformer.

Figure 5:
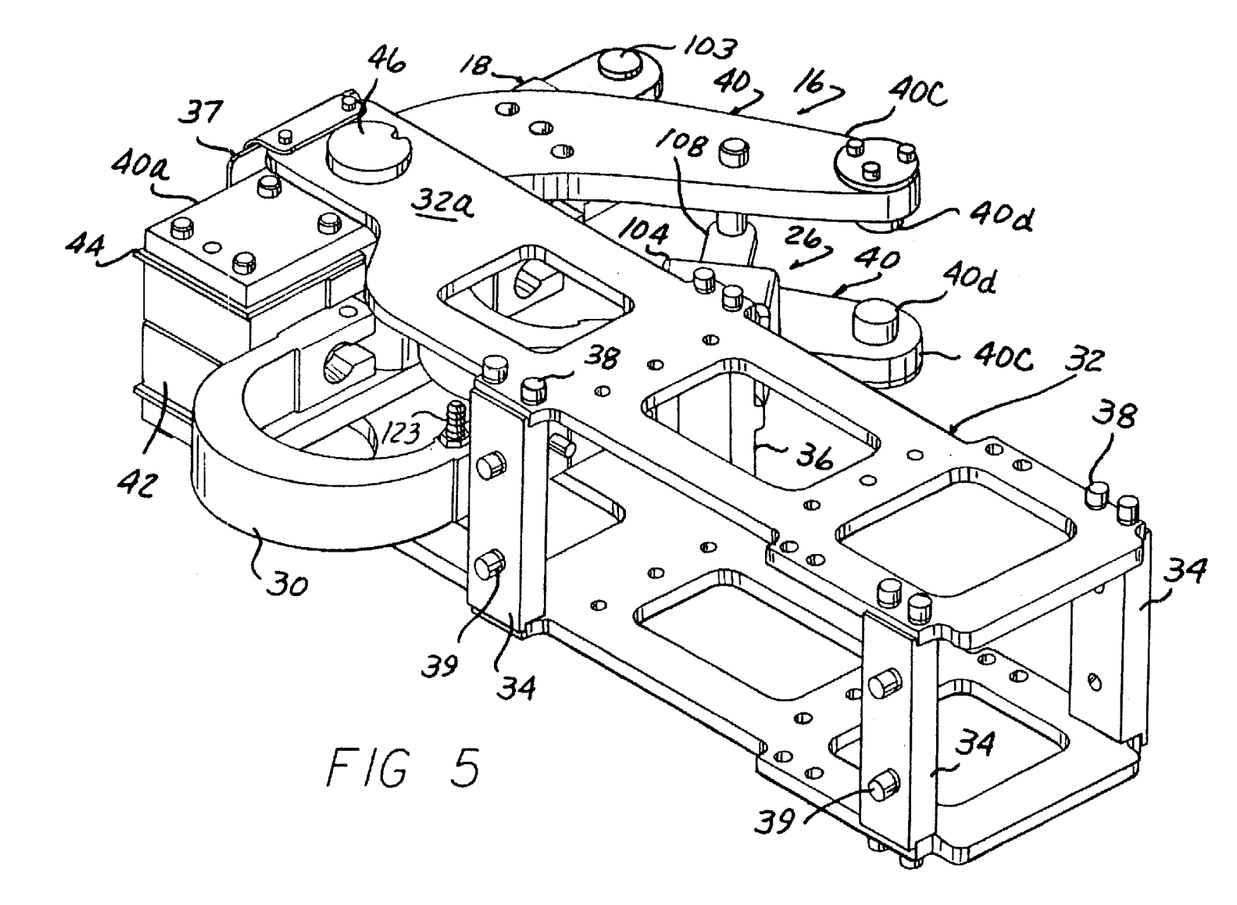
FIG. 5 is a perspective view of the basic skeletal structure of the weld gun.
Figure 6:
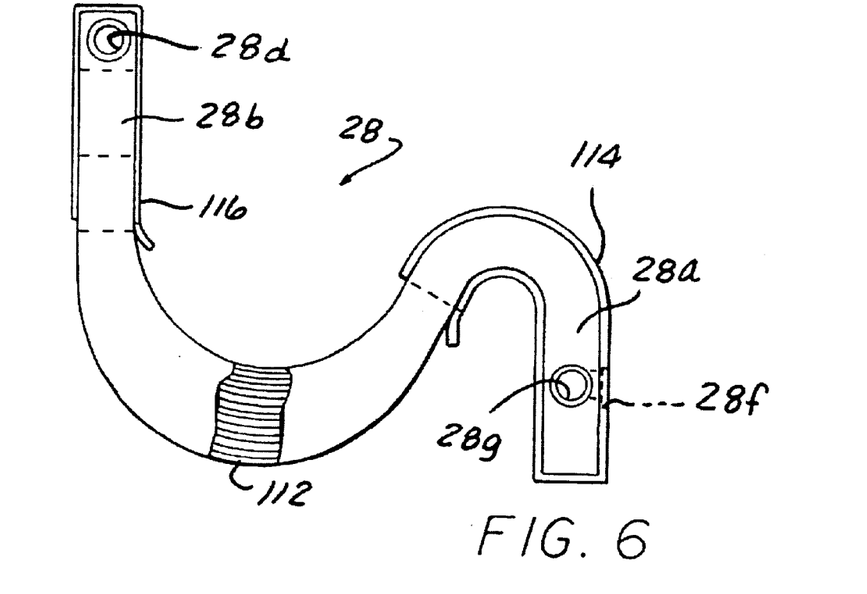
FIGS. 6, 7 and 8 are elevational, end, and perspective views of a first shunt utilized in the weld gun.
Figures 7, 8:
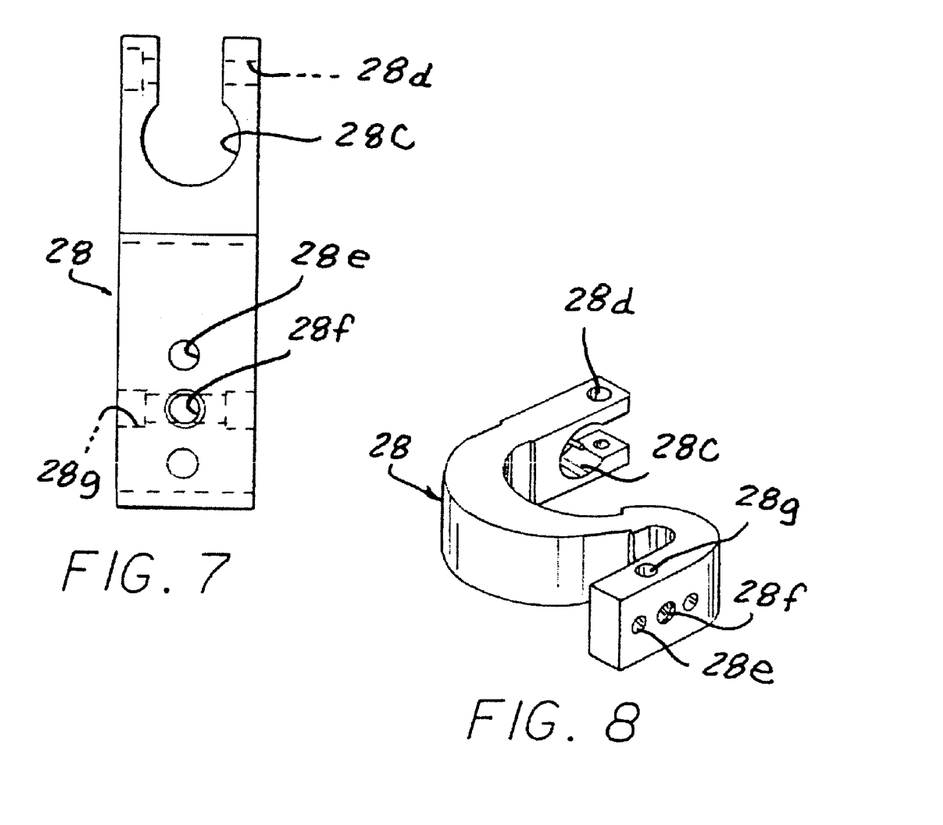
Figures 9, 10, 11, 12:
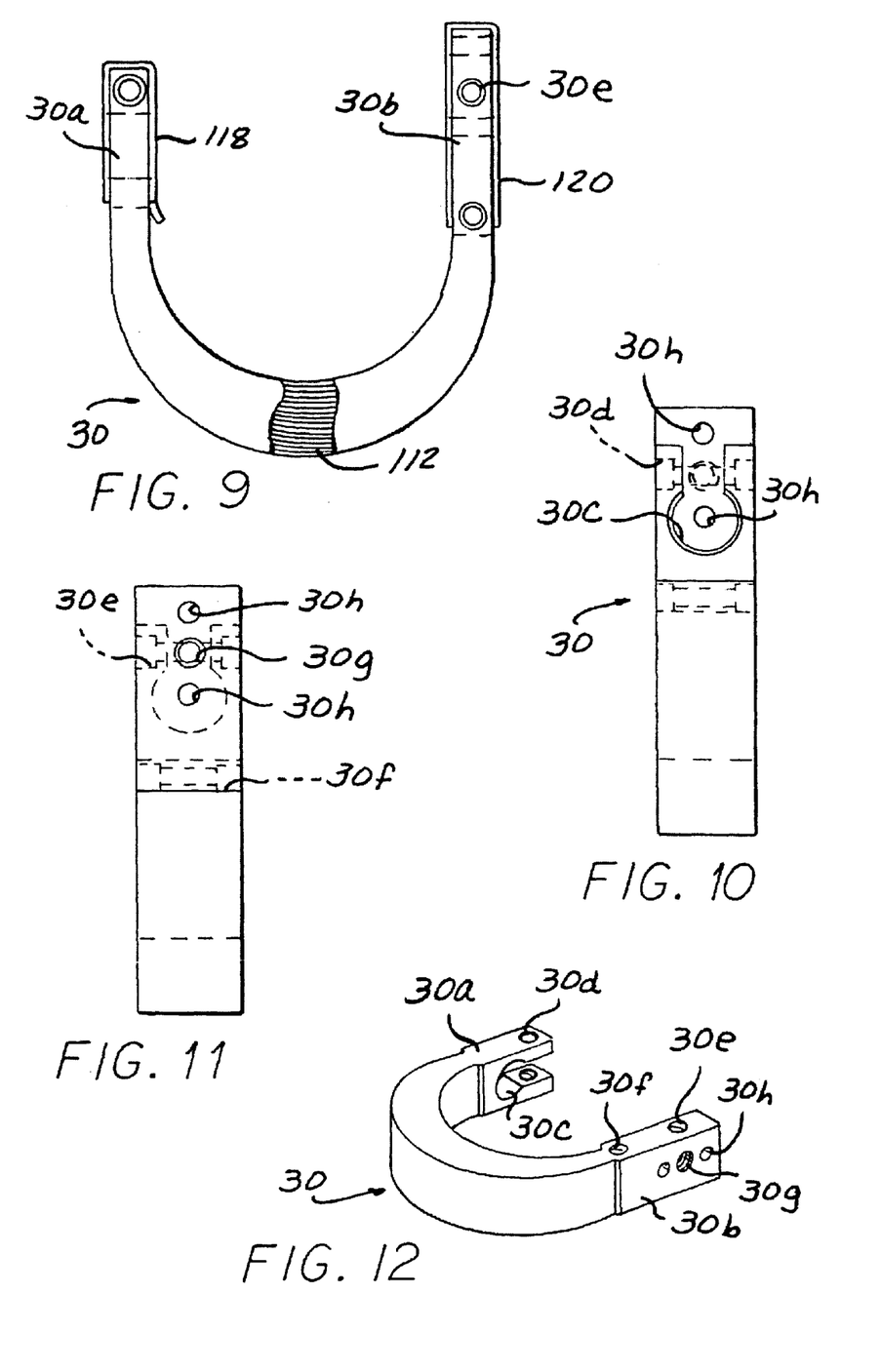
FIGS. 9, 10, 11 and 12 are elevational, front end, rear end, and perspective views of a second shunt utilized in the weld gun.
Figure 13:
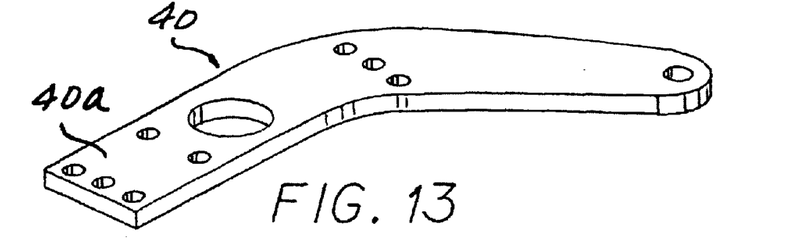
FIGS. 13–16 are detail views of component parts of the weld gun.
Figure 14:
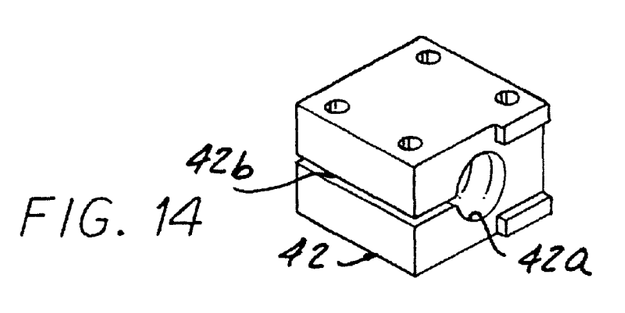
Figures 15, 16:
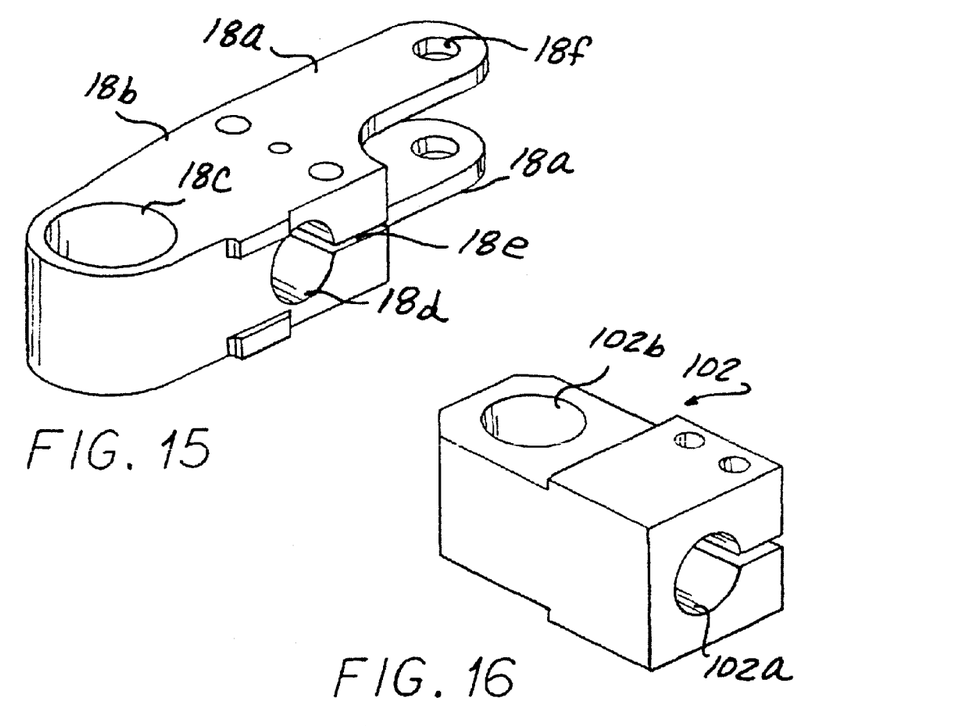

Cage or cradle 14 (FIGS. 1, 2 and 5) is arranged to straddle the transformer and includes side plates 32, cross bars 34 and 36, and a front shield 37. Cage 14 fits around the transformer with forward bracket arm portions 32a of the side plates extending forwardly beyond the front face 12d of the transformer. Shield 37 is fixedly secured to and extends between the front ends of bracket portions 32a. Bolts 38 fixedly secure cross-bars 34, 36 to side plates 32 and set screws 39 fixedly mount the cage on the transformer.

Outer weld arm assembly 16 (FIGS. 1, 2, 5, 13 and 14) includes a pair of spaced arcuate side arms 40 and a holder block 42 fixedly positioned between the lower ends 40a of the side arms 40 via bolts 43. A pair of spacer plates 44 are positioned between the opposite faces of block 42 and the respective confronting inner faces of side arm lower end portions 40a.

Figure 4:
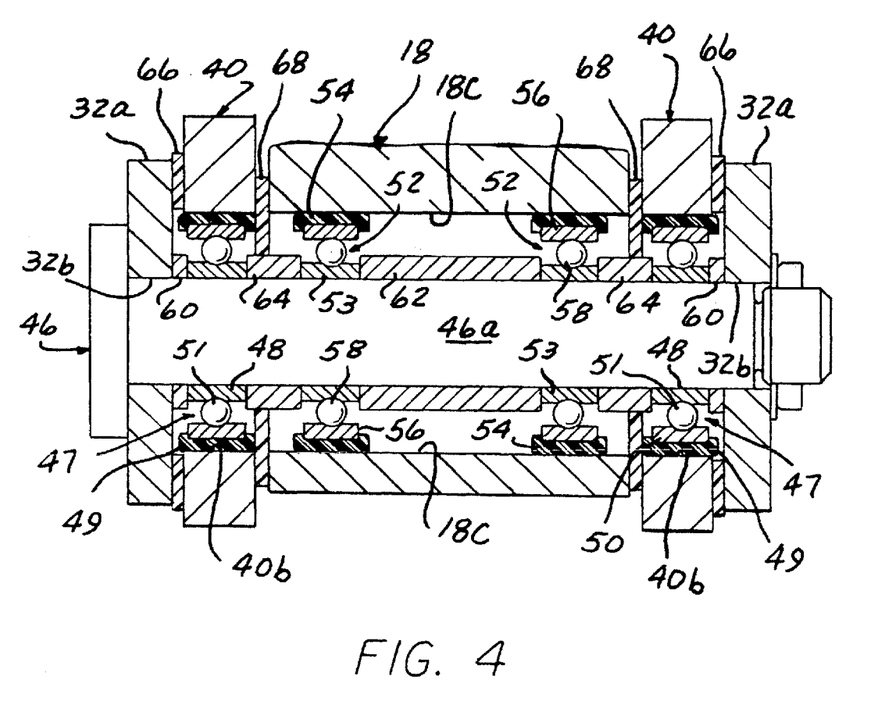
FIG. 4 is a cross-sectional view taken on line 4—4 of FIG. 2.

Side arms 40 are pivotally secured to the bracket arm portions 32a of the side plates of the cage via a clevis or pivot pin 46 passing through aligned apertures 32b (FIG. 4) in bracket arm portions 32a and through apertures 40b in the respective side plates. A ball bearing assembly 47 is positioned between each aperture 40b and the main body portion of 46a of the clevis pin 46. Each bearing assembly 47 includes an inner race 48 fixedly secured to pivot pin main body portion 46a, an annular dielectic member 49 (formed of a suitable insulative materials such for example as nylon) fixedly positioned within the respective aperture 40b and having an inwardly facing cup shaped configuration in cross-section; an outer race 50 fixedly secured within the annular cup defined by annular member 49, and a ball run 51 rolledly positioned between inner and outer races 48 and 50.

Inner weld arm 18 (FIGS. 1, 2, 5 and 15) has a devised upper configuration defined by spaced arm portions 18a and a monolithic lower main body portion 18b defining a lower cross bore 18c receiving pivot pin 46. The lower end 18b of arm 18 is pivoted on pivot pin 46 via spaced ball bearing assemblies 52 (FIG. 4) each including an inner race 53 fixedly secured to a respective portion of pivot pin main body portion 46a, an outer annular insulative member 54 fixedly positioned within bore 18c and having an inwardly facing cup shaped cross-sectional configuration, an outer race 56 fixedly positioned within the annular cup defined by annular member 54, and a ball race 58 rollably positioned between the inner and outer races.

An annular spacer 60 is positioned between the inner face of each bracket side arm portion 32a and the inner race of a respective bearing assembly 47; an annular spacer 62 is positioned between the inner races 53 of the respective bearing assemblies 50; and annular spacers 64 are positioned between the inner race of each bearing assembly 47 and the inner race of the respective bearing assembly 52. Insulative annular shims 66 are positioned between the inner faces of bracket arm portions 32a and the respective side arms 40 and further insulative annular shims 68 are positioned between the inner face of each side arm 40 and a respective outer face of inner arm 18. Bearings 47 and 52, in coaction with spacers 60, 62 and 64 and shims 66 and 68 will be seen to provide a robust journaling of the outer arms 40 and the inner arm 18 on the pivot pin 46 while providing effective electrical insulation between the arms and the cage structure.

Upper electrode assembly 20 (FIGS. 1, 2 and 17) includes an electrode 70, a hex adapter 72 secured to the free front end 70a of the electrode, a cap adapter 74 connected to hex adapter 72, an electrode cap or weld tip 76 connected to cap adapter 74, and a central coolant tube 80 positioned concentrically in a central axial passage 70b in electrode 70. Coolant tube 80 coacts with passage 70b to define concentric axially extending coolant fluid passages including a central inner passage defined within tube 80 and an annular outer passage 81 defined between passage 70b and tube 80. It will be understood that, in known manner, the concentric coolant fluid passages extend through hex adapter 72, and cap adapter 74 whereby to deliver coolant fluid to weld tip 76 and return coolant fluid from the tip. For example, coolant fluid may be delivered via inner tube 80 and return flow may be provided via annular outer passage 81.

Figure 17:
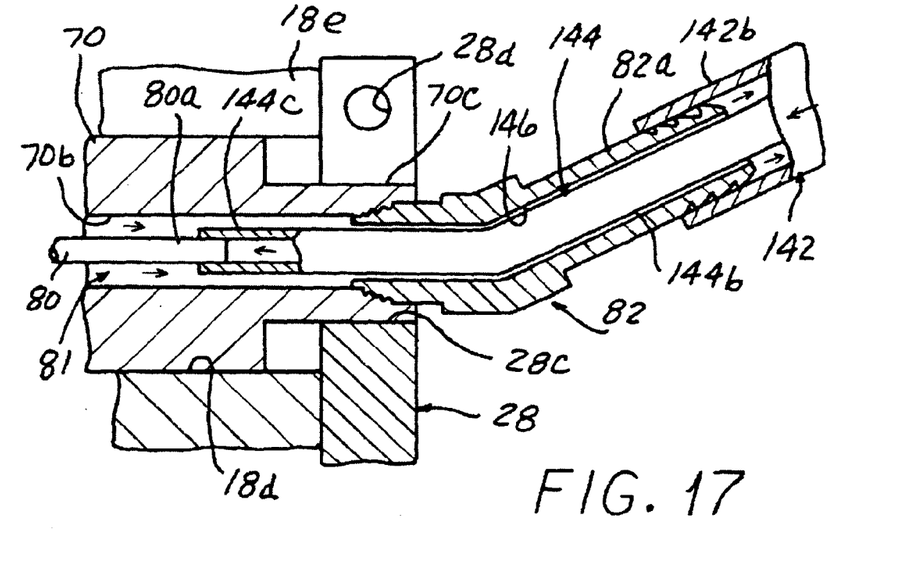
FIG. 17 is a fragmentary cross-sectional view taken within the circle 17 of FIG. 3.

The rear end 70c of electrode 70 is clampingly received in a bore 18d defined in arm 18 with clamping accomplished via a split 18e in the arm coacting with suitable fasteners passing through and interconnecting the sides of the arm on opposite sides of the split. An angled fitting 82 is threadably received in a reduced diameter rear portion 70c of electrode 70.

Lower electrode assembly 22 (FIGS. 1 and 2) includes an electrode 83, a hex adapter 84 connected to the free front end 83a of electrode 83, a cap adapter 86, an electrode cap or weld tip 88 connected to cap adapter 86, and a central coolant tube 89 positioned concentrically in a central axial passage 83b in electrode 83. Coolant tube 89 coacts with passage 83b to define concentric axially extending coolant fluid passages including a central inner passage defined within tube 89 and an annular outer passage 90 defined between passage 83b and tube 89. It will be understood that, in known manner, the concentric coolant fluid passages extend through hex adapter 84 and cap adapter 86 whereby to deliver coolant fluid to weld tip 88 and return coolant fluid from the tip. For example, coolant fluid may be delivered via inner tube 89 and return flow may be provided via an annular outer passage 90. The rear end 83c of electrode 83 is clampingly received in an aperture 42a in holder 42 with a split 42b in the lower end of the holder coacting with fasteners 43 to effect the clamping action. An angled fitting 91 is threadably received in a reduced diameter rear portion 83d of electrode 83.

Figure 3:
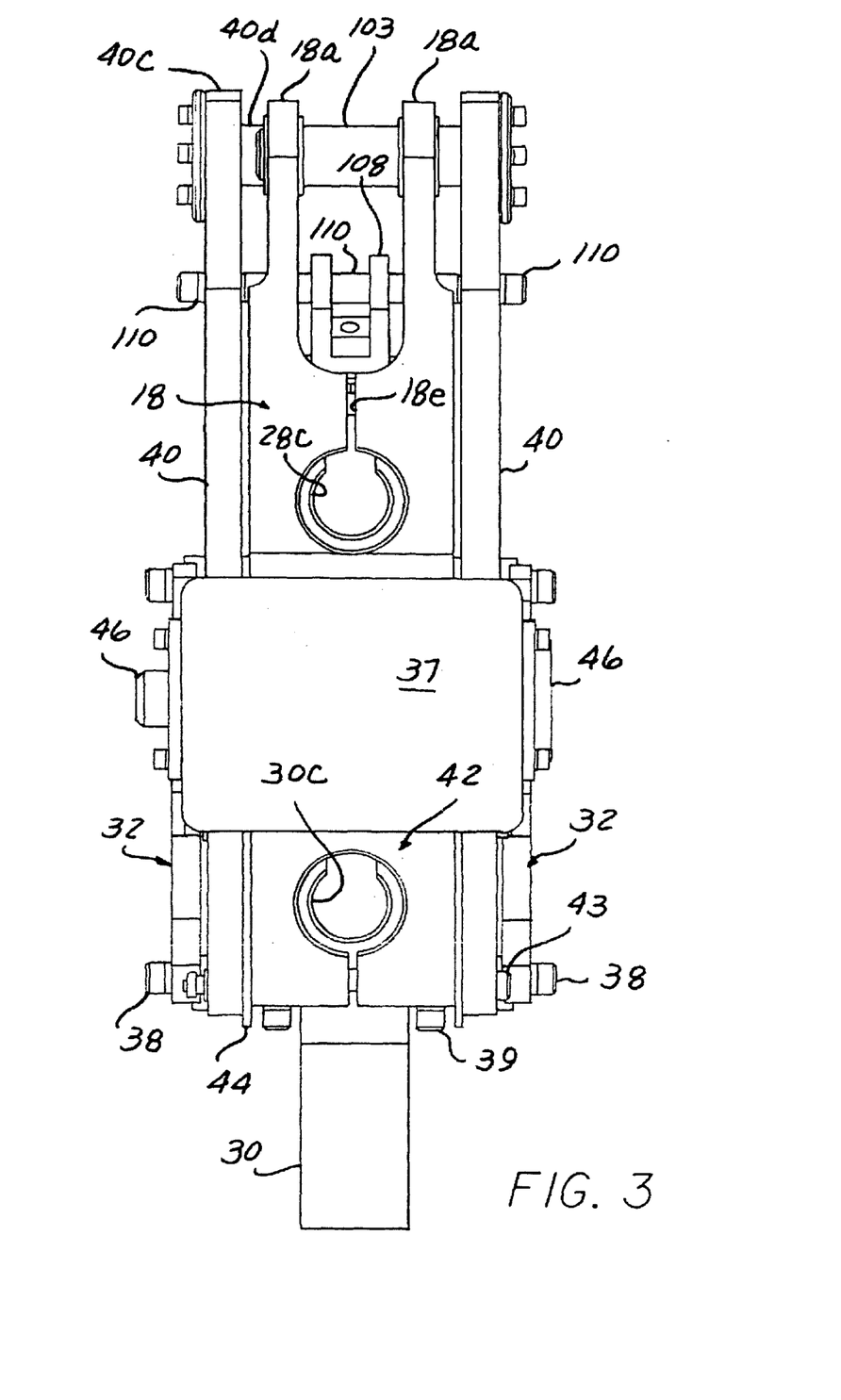
FIG. 3 is an end view of the weld gun.

Power cylinder assembly 24 (FIGS. 1, 2 and 16) includes a cylinder main body 92 clampingly positioned between end plates 94 via tie rods 96, a mounting block 98 provided on the front face of front end plate 94, a piston rod 100 connected in known manner with a piston received within the cylinder body 92, and a cylinder rod end 102. The front end 100a of piston rod 100 is clampingly received in a bore 102a in the rear face of cylinder rod end 102 and a bore 102b in the forward end of rod end 102 receives a pivot pin 103 passing through apertures 18f in spaced clevis upper arm portions 18a of inner arm 18 to pivotally mount the front end of the piston rod to the upper end of the inner arm 18. Power cylinder assembly 24 may for example comprise a hydraulic cylinder assembly. The upper ends 40c of outer arms 40 define trunnions 40d (FIGS. 3 and 5) which are journaled in suitable sockets in cylinder mounting block 98 to pivotally connect the upper ends of arms 40 to the power cylinder assembly 24.

Balancing cylinder assembly 26 (FIGS. 1, 2, 3 and 5) may comprise, for example, an air cylinder and includes a cylinder body 104 pivotally mounted by a pin 106 on a bracket portion 36a of cage cross bar 36, a piston rod 106 suitably connected to the piston within cylinder 104, and a clevis 108 fixedly secured to the upper free end of a piston rod 106 and carrying a cross rod 110 journaled at its opposite ends in suitable apertures in spaced arms 40 whereby to pivotally mount the upper end of piston rod 106 with respect to arms 40.

Upper shunt 28 (FIGS. 1, 2, 5, 6, 7, 8, 17 and 18) has a serpentine configuration and has a laminated copper construction whereby to provide a flexible electrical interconnection between the transformer and upper electrode assembly 20. Shunt 28 is formed of a plurality (for example 95) of elongated strips of copper 112 which are suitably fixedly secured together at their opposite ends 28a and 28b but are unsecured intermediate the unified ends so that they are free to flex between the unified ends. Unified end 28a is encased in a serpentine clip 114 and unified end 28b is encased in a linear clip 116. Shunt end 28b has a clevis configuration and defines a partially circular opening 28c adapted to be clampingly secured to the reduced diameter portion 70c of electrode 70 utilizing suitable clamping bolts passing through bores 28d. Shunt end 28a is provided with suitable bolt apertures 28e to fixedly secure the shunt end to the front face 12d of the transformer and is further provided with a coolant passage 28f communicating with a cross bore 28g. Passage 28f in turn communicates with an inlet/outlet end 13a of transformer coolant passage system 13 whereby to facilitate the delivery of a suitable cooling fluid to the transformer coolant system via cross-bore 28g and passage 28f. It will be understood that clips 114 and 116 are suitably formed and apertured to conform to and accommodate the form and apertures of the corresponding ends of the shunt.

Lower shunt 30 (FIGS. 1, 2, 5, 9, 10, 11,12 and 18) has a generally U-shaped configuration and is formed of a plurality (for example 95) of elongated copper strips 112 which are suitably fixedly secured together at their opposite ends 30a and 30b but are unsecured intermediate the unified ends so they are free to flex between the unified ends. Unified end 30a is encased in a clip 118 and unified end 30b is encased in a clip 120. End 30a has a clevis configuration defining a partially circular opening 30c whereby to facilitate the clamping engagement of the end 30a to the reduced diameter portion 83d of electrode 83 utilizing a clamping bolt passing through bores 30d. End 30b is provided with a pair of vertically spaced cross-bores 30e and 30f Upper cross-bore 30e communicates with a coolant passage 30g. End 30b is secured to the front face 12d of the transformer immediately below the end 28a of the upper shunt utilizing suitable fasteners passing through apertures 30h. Thus positioned, cooling passage 30g communicates with an inlet/outlet end 13b of transformer coolant passage system 13 so that a cooling fluid may be circulated through bore 28g of the upper shunt, through passage 28f to coolant system inlet/outlet 13a, routed in cooling fashion around the transformer through coolant system 13, returned via inlet/outlet 13b to passage 30g of lower shunt 30, and discharged through cross bore 30e of the lower shunt, whereby to provide a continuous flow of cooling fluid to and through the transformer and to the electrical interfaces between the shunts and the transformer. If desired or required, further cooling fluid flow may be provided through cross bore 30f It will be understood that clips 118 and 120 are suitably formed and apertured to conform to and accommodate the form and apertures of the corresponding ends of shunt 30.

Coolant distributor assembly 31 (FIGS. 1, 2, 17 and 19) includes a mounting plate 122 a distributor block 124 and concentric tubing assemblies 126 and 128.

Figure 19:
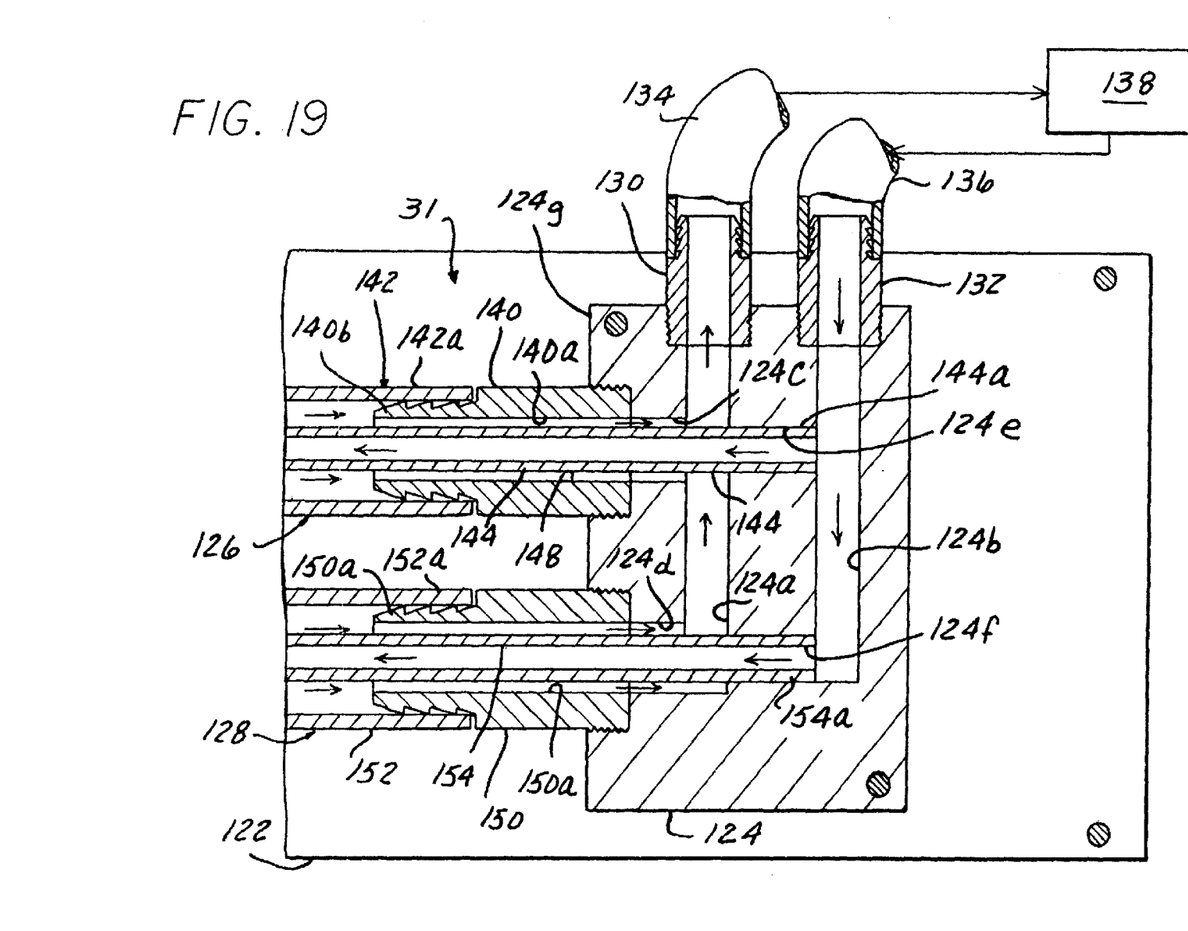
FIG. 19 is a cross-sectional view of a portion of the coolant distributor assembly seen in FIG. 1A.

Mounting plate 122 has a rectangular configuration and is sized to be fixedly mounted via suitable fastener devices on top of cradle 14 in overlying relation to transformer 12. The plate may extend for example from the rear top cross bar 34 to the front top cross bar 36 and may provide a notch 122a to accommodate the bracket portion 36a of cage cross bar 36.

Distributor block 124 has a monolithic configuration and is mounted on the top face of mounting plate 122 proximate the rear edge 122b of the plate. Block 124 defines parallel transverse bores 124a and 124b parallel axial bores 124c and 124d, and further parallel axial bores 124e and 124f in respective axial alignment with bores 124c and 124d.

Threaded fittings 130 and 132 communicate with one end of transverse passages 124a and 124b respectively and receive hoses 134 and 136 which extend to suitable inlet and outlet ports of a source 138 of cooling liquid. This arrangement allows cooling liquid to be supplied for example from source 138 to passage 124b and returned to the source 138 via passage 124a.

Concentric tubing assembly 126 includes a fitting 140, a hose 142 and a central tube 144.

Fitting 140 is threadably received in a front face 124g of block 124 with its inner diameter 140a coextensive with bore 124c. Hose 142 is received at one end 142a over the barbed end 140b of fitting 140 and extends forwardly to a front end 142b which is fitted over the barbed, angled end 82a of fitting 82. Central tube 144 is press fit at a rear end 144a thereof in passage 144e and extends forwardly across passage 124a through passage 124c, and through the central passage of the fitting 140 whereafter it extends forwardly and concentrically within and through hose 142 to its forward end 144b which is fitted concentrically within fitting 82 and which connects telescopically at the extreme forward end 144c thereof with the rear end 80a of tube 80. Tube 144 is spaced radially from fitting 82 to define an annular passage 118 between the tube and the fitting and is spaced radially from fitting 140 to define an annular passage 148 between the tube and the fitting.

It will seen that a coolant flow passage is thereby established between coolant liquid source 138 and welding tip 76 via hose 136 fitting 132, passage 124b tube 144 and tube 80 and that a continuous return flow passage is established between weld tip 76 and source 10 via annular passage 81, annular passage 146, the annular space between hose 142 and tube 144, annular passage 148, passage 124c. passage 124a, fitting 130 and hose 134.

Concentric tubing assembly 128 includes a fitting 150, a hose 152, and a central inner tube 154.

Fitting 150 is threadably received in the front face 124g of distributor block 124 with the inner diameter 150a of the fitting coextensive with passage 124d; one end 152a of hose 152 is fitted over the barbed end 150a of fitting 150; the other end 152b of the hose is fitted (FIG. 2) over the barbed end 91 a of angle fitting 91; and the rear end 154a of tube 154 is press fit in passage 124f and extends forwardly across passage 124a through passage 124d, through fitting 150, and concentrically within hose 152 to a front end (not shown) which is telescopically coupled to the rear end of tube 89. As with the tubing assembly 126, central tube 154 is spaced radially throughout its length from the surrounding hardware so as to define a continuous annular passage between weld tip 88 and source 138 and define a continuous central passage between source 138 and weld tip 88 whereby to allow the provision of recirculating flow of coolant fluid from the source to the weld tip. As with the concentric tubing assembly 126, the flow from the source 138 to the weld tip 88 may be through passage 124b central tube 154 and central tube 89 and the return flow may be via the annular passageways defined around central tube 89 and central tube 154 and finally via passage 124a and hose 134 to source 138.

In a typical operation of the invention welding gun, the gun is attached to a robot (for example by attaching the robot to the cage 14); gross adjustment of the overall welding gun is performed utilizing the robot; and the upper and lower electrode caps are moved against opposite faces of a workpiece to be welded by simultaneous actuation of power cylinder 24 and air cylinder 26.

The weld gun of the invention provides many important advantages as compared to prior art weld guns. Specifically, the use of a shunt incorporating built in cooling passages for delivery of coolant to the transformer simplifies the construction of the gun and reduces the cost of the gun; the use of an electrically insulated ball bearing at the central pivot of the gun provides a more robust construction as compared to prior art sleeve bushing constructions while yet providing the required electrical insulation between the electrodes and the main frame of the gun; the gun design allows the ready interchange of the power cylinder with a servo motor of known configuration; the use of a distributor block at a location remote from the electrodes in combination with concentric tubing extending from the distributor block to the electrodes minimizes the volume of tubing required to provide the cooling function and thereby simplifies the gun both structurally and operationally; the use of identical side plates to establish all of the critical dimensions of the components of the gun insures that tolerances will be maintained on all of the critical dimensions and at all of the critical points; and the use of identical side plates further simplifies reconfiguration of the gun since the shape and the configuration of the side plates may be changed to accommodate a different welding requirement while continuing to utilize much of the same componentry of the welding gun in the new configuration.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A weld gun including a frame structure, a weld arm, and a pivot structure pivotally mounting the weld arm on the frame structure, characterized in that:

the pivot structure comprises a pivot pin carried by the frame structure, an inner race mounted on the pivot pin, an annular member of electrically insulative material positioned in an aperture in the weld arm, an outer race mounted within the annular member, and a ball race rollably positioned between the inner race and the outer race.

2. A weld gun according to claim 1 wherein:

the weld arm comprises a first weld arm;

the inner race comprises a first inner race;

the annular member comprises a first annular member;

the outer race comprises a first outer race;

the ball race comprises a first ball race; and the weld gun further includes a second weld arm, a second inner race mounted on the pivot pin, a second annular member of electrically insulated material positioned in an aperture in the second weld arm, a second outer race mounted within the second annular member, and a second ball race rollably positioned between the second inner race and the second outer race.

3. A weld gun according to claim 2 wherein:

the first weld arm includes laterally spaced first and second arm portions;

the second arm is positioned between the spaced arm portions of the first weld arm;

the first inner race, first annular member, first outer race and first ball race journal the first arm portion of the first weld arm on the pivot pin; and the weld gun further includes a third inner race mounted on the pivot pin, a third annular member of electrically insulative material positioned in an aperture in the second arm portion of the first arm, a third outer race mounted within the third annular member, and a third ball race positioned between the third outer race and the third inner race.

4. A weld gun according to claim 3 wherein the weld gun further includes a fourth inner race mounted on the pivot pin proximate the first inner race, a fourth annular member of electrical insulative material positioned in an aperture in the second weld arm, a fourth outer race mounted within the fourth annular member, and a fourth ball race positioned between the fourth outer race and the fourth inner race.

5. A weld gun including:

a frame structure;

a weld arm;

a pivot pin carried by the frame structure;

an inner race mounted on the pivot pin;

an annular member of electrically insulative material positioned in an aperture in the weld arm;

an outer race mounted within the annular member; and a ball race rollably positioned between the inner race and the outer race.

6. A weld gun according to claim 5 wherein:

the weld arm comprises a first weld arm;

the inner race comprises a first inner race;

the annular member comprises a first annular member;

the outer race comprises a first outer race;

the ball race comprises a first ball race; and the weld gun further includes a second weld arm, a second inner race mounted on the pivot pin, a second annular member of electrically insulative material positioned in an aperture in the second weld arm, a second outer race mounted within the second annular member, and a second ball race rollably positioned between the second inner race and the second outer race.

7. A weld gun according to claim 6 wherein:

the first weld arm includes laterally spaced first and second arm portions;

the second arm is positioned between the spaced arm portions of the first weld arm;

the first inner race, first annular member, first outer race and first ball race journal the first arm portion of the first weld arm on the pivot pin; and the weld gun further includes a third inner race mounted on the pivot pin, a third annular member of electrically insulative material positioned in an aperture in the second arm portion of the first arm, a third outer race mounted within the third annular member, and a third ball race positioned between the third outer race and the third inner race.

8. A weld gun according to claim 7 wherein the weld gun further includes a fourth inner race mounted on the pivot end proximate the first inner race, a fourth annular member of electrically insulative material positioned in an aperture in the second weld arm, a fourth outer race mounted within the fourth annular member, and a fourth ball race positioned between the forth outer race and the fourth inner race.

9. A weld gun including:

a frame structure;

a pivot pin carried by the frame structure;

first and second weld arms;

a first annular member of electrically insulative material positioned in an aperture in the first weld arm;

a second annular member of electrically insulative material positioned in an aperture in the second weld arm;

a first outer race mounted within the first annular member;

a second outer race mounted within the second annular member;

first and second inner races mounted on the pivot pin;

a first ball race rollably positioned between the first inner race and the first outer race; and a second ball race rollably positioned between the second inner race and the second outer race.

10. A weld gun according to claim 9 wherein:

the first weld arm includes laterally spaced first and second arm portions;

the second arm is positioned between the spaced arm portions of the first weld arm;

the first inner race, the first annular member, the first outer race and the first ball race journal the first arm portion of the first weld arm on the pivot pin; and the weld gun further includes a third inner race mounted on the pivot pin, a third annular member of an electrically insulative material positioned in an aperture in the second arm portion of the first arm, a third outer race mounted within the third annular member, and a third ball race positioned between the third outer race and the third inner race.

11. A weld gun according to claim 10 wherein the weld gun further includes a fourth inner race mounted on the pivot pin proximate the first inner race, a fourth annular member of electrically insulative material positioned in an aperture in the second weld arm, a fourth outer race mounted within the fourth annular member, and a fourth ball race positioned between the fourth outer race and the fourth inner race.

12. A weld gun including a frame structure, a transformer carried by the frame structure and including a coolant passage system, an electrode mounted on the frame structure and including an electrode cap at one end of the electrode, and a shunt fixedly secured at one end thereof to another end of the electrode and fixedly secured at another end thereof to the transformer, characterized in that:

the other end of the shunt includes a coolant passage communicating with the transformer coolant passage system whereby a coolant may be delivered to the transformer coolant passage system through the coolant passage in the other end of the shunt.

13. A weld gun according to claim 12 wherein:

the electrode comprises a first electrode;

the shunt comprises a first shunt;

the weld gun further includes a second electrode mounted on the frame structure and including an electrode cap at one end of the second electrode, and a second shunt fixedly secured at one end thereof to another end of the second electrode and fixedly secured at another end thereof to the transformer proximate the other end of the first shunt; and the other end of the second shunt includes a coolant passage communicating with the transformer coolant passage system, whereby coolant may be delivered to the transformer coolant passage system through the coolant passage in the other end of the first shunt and discharged from the transformer coolant passage system through the coolant passage in the other end of the second shunt to provide a continuous flow of coolant through the transformer coolant passage system.

14. A weld gun including:

a frame structure;

a transformer carried by the frame structure and including a coolant passage system;

a weld arm mounted on the frame structure;

an electrode mounted on the weld arm and including an electrode cap at one end of the electrode; and a shunt fixedly secured at one end thereof to another end of the electrode, fixedly secured at another end thereof to the transformer, and including a coolant passage communicating with the transformer coolant passage system whereby a coolant may be delivered to the transformer coolant passage system through the coolant passage in the other end of the shunt.

15. A weld gun according to claim 14 wherein:

the weld arm comprises a first weld arm;

the electrode comprises a first electrode;

the shunt comprises a first shunt; and the weld gun further includes a second weld arm mounted on the frame structure, a second electrode mounted on the second weld arm and including an electrode cap at one end of the second electrode, and a second shunt fixedly secured at one end thereof to another end of the second electrode, fixedly secured at another end thereof to the transformer proximate the other end of the first shunt, and including a coolant passage communicating with the transformer coolant passage system, whereby coolant may be delivered to the transformer coolant passage system through the coolant passage in the other end of the first shunt and discharged from the transformer coolant passage system through the coolant passage in the other end of the second shunt to provide a continuous flow of coolant through the transformer coolant passage system.

16. A weld gun including a frame structure, a weld arm mounted on the frame structure, an electrode mounted at one end thereof on the weld arm and defining concentric cooling passages for delivery of a cooling liquid from the one electrode end to a weld tip at an opposite end of the electrode and return movement of cooling liquid from the weld tip to the one electrode end, a source of cooling liquid, and coolant flow means interconnecting the one end of the electrode and the cooling liquid source and operative to deliver cooling liquid from the source to the one electrode end for delivery to the weld tip and receive cooling liquid from the one electrode end for return flow to the source, characterized in that:

the coolant flow means comprises a distribution device mounted on the frame structure at a location remote from the one end of the electrode, tubing structure for delivering coolant liquid from the source to the distributor device and return cooling liquid from the distributor device to the source, and concentric tubing extending from the distribution device to the one end of the electrode for respective connection to the respective concentric cooling passages defined by the electrode.

17. A weld gun according to claim 16 wherein:

the electrode comprises a first electrode and the weld arm comprises a first weld arm;

the weld gun further includes a second weld arm mounted on the frame structure and a second electrode mounted at one end thereof on the second weld arm and defining concentric cooling passages for delivery of cooling liquid to a second weld tip on the opposite end of the second electrode and return movement of cooling liquid from the second weld tip to the one end of the second electrode; and the coolant flow means further includes further concentric tubing extending from the distributor device to the one end of the second electrode for respective connection to the respective cooling passages defined by the second electrode.

18. A weld gun according to claim 16 wherein:

the weld gun includes a transformer;

the frame structure defines a cage structure mounting the transformer; and the distribution device comprises a distributor block mounted on the cage structure proximate the transformer.

19. A weld gun according to claim 18 wherein:

the weld gun includes a shunt connected at a first end thereof to the one end of the electrode and at a second end thereof to the transformer; and the first end of the shunt clampingly engages the one end of the electrode in surrounding relation to the concentric cooling passages defined by the electrode and the concentric tubing.

20. A weld gun including a frame structure, a weld arm, and a pivot structure pivotally mounting the weld arm on the frame structure, characterized in that:

the pivot structure comprises a pivot pin carried by the frame structure and positioned in an aperture in the weld arm, an inner race encircling the pivot pin, an annular member of electrically insulative material positioned in concentric relation to the inner race, an outer race encircling the inner race, and a ball race rollably positioned between the inner race and the outer race.

21. A weld gun according to claim 20 wherein:

the weld arm comprises a first weld arm;

the inner race comprises a first inner race;

the annular member comprises a first annular member;

the outer race comprises a first inner race;

the ball race comprises a first ball race; and the weld gun further includes a second weld arm having an aperture receiving the pivot pin, a second inner race encircling the pivot pin within the aperture in the second weld arm, a second annular member of electrically insulative material positioned in concentric relation to the second inner race, a second outer race encircling the second inner race, and a second ball race rollably positioned between the second inner race and the second outer race.

* * * * *